US012603978B2

(12) United States Patent
 Xiong

(10) Patent No.: US 12,603,978 B2
(45) Date of Patent: Apr. 14, 2026

(54) SYSTEM AND METHOD FOR PARALLAX CORRECTION FOR VIDEO SEE-THROUGH AUGMENTED REALITY

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 18/302,622

(22) Filed: Apr. 18, 2023

(65) Prior Publication Data

US 2024/0121370 A1 Apr. 11, 2024

Related U.S. Application Data

(60) Provisional application No. 63/411,857, filed on Sep. 30, 2022.

(51) Int. Cl.
 *H04N 13/128* (2018.01)
 *G06T 3/18* (2024.01)
 (Continued)

(52) U.S. Cl.
 CPC ............. *H04N 13/128* (2018.05); *G06T 3/18* (2024.01); *G06T 7/593* (2017.01); *G06T 19/006* (2013.01);
 (Continued)

(58) Field of Classification Search
 None
 See application file for complete search history.

(56) References Cited

U.S. PATENT DOCUMENTS 10,742,950 B2 8/2020 Cook
10,832,487 B1 * 11/2020 Ulbricht .................. G06F 3/011
 (Continued)

FOREIGN PATENT DOCUMENTS

CN 113808187 A 12/2021
WO 2021126424 A1 6/2021

OTHER PUBLICATIONS

International Search Report and Written Opinion of the International Searching Authority dated Oct. 19, 2023, in connection with International Application No. PCT/KR2023/010209, 9 pages.

(Continued)

*Primary Examiner* — Jason A Pringle-Parker

(57) ABSTRACT

A method includes obtaining a stereo image pair including a first image and a second image. The method also includes generating a first feature map of the first image and a second feature map of the second image, the first and second feature maps including extracted positions associated with pixels in the images. The method further includes generating a disparity map between the first and second images based on a dense depth map. The method also includes generating a verified depth map based on a pixelwise comparison of predicted positions and the extracted positions associated with at least some of the pixels in at least one of the images, the predicted positions determined based on the disparity map. In addition, the method includes generating a first virtual view and a second virtual view to present on a display panel of an VST AR device based on the verified depth map.

20 Claims, 11 Drawing Sheets

(51) Int. Cl.

| | |
|---|---|
| *G06T 7/593* | (2017.01) |
| *G06T 19/00* | (2011.01) |
| *H04N 13/00* | (2018.01) |
| *H04N 13/111* | (2018.01) |
| *H04N 13/239* | (2018.01) |
| *H04N 13/271* | (2018.01) |
| *H04N 13/332* | (2018.01) |

(52) U.S. Cl.
CPC ......... *H04N 13/111* (2018.05); *H04N 13/239* (2018.05); *H04N 13/271* (2018.05); *G06T 2207/10024* (2013.01); *G06T 2207/20084* (2013.01); *H04N 2013/0081* (2013.01); *H04N 13/332* (2018.05)

(56) References Cited

U.S. PATENT DOCUMENTS

| | | | | |
|---|---|---|---|---|
| 10,965,929 | B1 | 3/2021 | Bellows et al. | |
| 11,037,359 | B1 | 6/2021 | Bleyer et al. | |
| 11,039,168 | B2 | 6/2021 | Tian | |
| 11,127,148 | B1 | 9/2021 | Edmonds et al. | |
| 11,330,200 | B2 | 5/2022 | Bleyer et al. | |
| 2011/0091096 | A1* | 4/2011 | Morris | G06T 7/593 |
| | | | | 382/154 |
| 2012/0039525 | A1* | 2/2012 | Tian | H04N 13/204 |
| | | | | 382/154 |
| 2013/0136338 | A1* | 5/2013 | Asente | G06T 7/174 |
| | | | | 382/154 |
| 2013/0329015 | A1* | 12/2013 | Pulli | G06T 7/593 |
| | | | | 348/47 |
| 2014/0055446 | A1* | 2/2014 | Corral-Soto | H04N 13/261 |
| | | | | 345/419 |
| 2014/0219549 | A1* | 8/2014 | Choi | G06T 7/593 |
| | | | | 382/154 |
| 2014/0267245 | A1* | 9/2014 | Tanger | G06T 15/00 |
| | | | | 345/419 |
| 2018/0027224 | A1* | 1/2018 | Javidnia | G06T 7/593 |
| | | | | 382/154 |
| 2018/0035097 | A1 | 2/2018 | Ohishi et al. | |
| 2019/0166350 | A1 | 5/2019 | Park | |
| 2021/0134013 | A1 | 5/2021 | Carlsson et al. | |
| 2021/0185294 | A1 | 6/2021 | Malaika | |
| 2021/0398306 | A1 | 12/2021 | Bleyer et al. | |
| 2022/0020165 | A1 | 1/2022 | Chen et al. | |
| 2022/0020168 | A1 | 1/2022 | Price et al. | |
| 2022/0050290 | A1 | 2/2022 | Fortin-Deschenes et al. | |
| 2022/0292289 | A1 | 9/2022 | Shalumov et al. | |

OTHER PUBLICATIONS

Giorgio Ballestin et al., "A Registration Framework for the Comparison of Video and Optical See-Through Devices in Interactive Augmented Reality", IEEE Access, vol. 9, Apr. 2021, 16 pages.
Supplementary European Search Report dated Aug. 26, 2025, in connection with European Patent Application No. 23872737.4, 16 pages.
Um et al., "Three-dimensional Scene Reconstruction Using Multiview Images and Depth Camera," Proceedings of SPIE—The International Society for Optical Engineering, Mar. 2005, 10 pages.

* cited by examiner

SYSTEM AND METHOD FOR PARALLAX CORRECTION FOR VIDEO SEE-THROUGH AUGMENTED REALITY

CROSS-REFERENCE TO RELATED APPLICATION AND PRIORITY CLAIM

This application claims priority under 35 U.S.C. § 119(e) to U.S. Provisional Patent Application No. 63/411,857 filed on Sep. 30, 2022, which is hereby incorporated by reference in its entirety.

TECHNICAL FIELD

This disclosure relates generally to augmented reality (AR) systems and processes. More specifically, this disclosure relates to a system and method for parallax correction for video see-through (VST) AR.

BACKGROUND

Augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

SUMMARY

This disclosure provides a system and method for parallax correction for video see-through (VST) augmented reality (AR).

In a first embodiment, a method includes obtaining a stereo image pair including a first image and a second image captured using first and second see-through cameras associated with a video see-through (VST) augmented reality (AR) device. The method also includes generating a first feature map of the first image and a second feature map of the second image, the first feature map including extracted positions associated with pixels in the first image, the second feature map including extracted positions associated with pixels in the second image. The method further includes generating a disparity map between the first and second images based on a dense depth map. The method also includes generating a verified depth map based on a pixelwise comparison of predicted positions and the extracted positions associated with at least some of the pixels in at least one of the first and second images, the predicted positions determined based on the disparity map. In addition, the method includes generating a first virtual view and a second virtual view to present on a display panel of the VST AR device based on the verified depth map.

In a second embodiment, a VST AR device includes at least one display panel and first and second see-through cameras. The electronic device also includes at least one processing device configured to obtain a stereo image pair including a first image and a second image captured using the first and second see-through cameras. The at least one processing device is also configured to generate a first feature map of the first image and a second feature map of the second image, the first feature map including extracted positions associated with pixels in the first image, the second feature map including extracted positions associated with pixels in the second image. The at least one processing device is further configured to generate a disparity map between the first and second images based on a dense depth map. The at least one processing device is also configured to generate a verified depth map based on a pixelwise comparison of predicted positions and the extracted positions associated with at least some of the pixels in at least one of the first and second images, the predicted positions determined based on the disparity map. In addition, the at least one processing device is configured to generate a first virtual view and a second virtual view to present on a display panel of the VST AR device based on the verified depth map.

In a third embodiment, a non-transitory machine-readable medium contains instructions that when executed cause at least one processor of an electronic device to obtain a stereo image pair including a first image and a second image captured using first and second see-through cameras associated with a video see-through (VST) augmented reality (AR) device. The medium also contains instructions that when executed cause the at least one processor to generate a first feature map of the first image and a second feature map of the second image, the first feature map including extracted positions associated with pixels in the first image, the second feature map including extracted positions associated with pixels in the second image. The medium further contains instructions that when executed cause the at least one processor to generate a disparity map between the first and second images based on a dense depth map. The medium also contains instructions that when executed cause the at least one processor to generate a verified depth map based on a pixelwise comparison of predicted positions and the extracted positions associated with at least some of the pixels in at least one of the first and second images, the predicted positions determined based on the disparity map. In addition, the medium contains instructions that when executed cause the at least one processor to generate a first virtual view and a second virtual view to present on a display panel of the VST AR device based on the verified depth map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
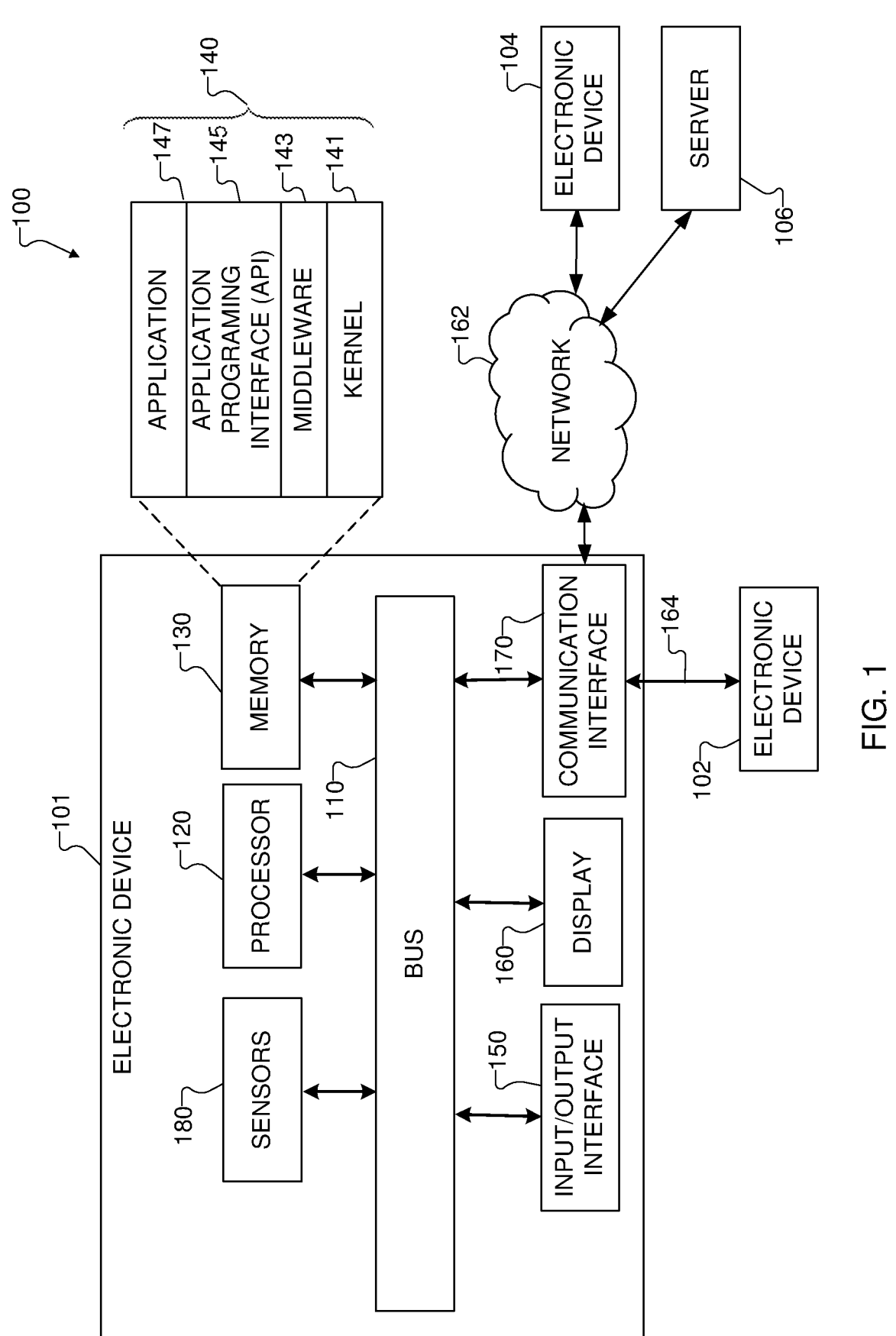
FIG. 1 illustrates an example network configuration including an electronic device according to this disclosure.

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

In various implementations, see-through cameras are typically high-resolution cameras (such as 2K or 4K cameras or higher). In order to provide quality user experiences with AR headsets, the latency of video frame transformations may need to be as low as possible in order to reduce or prevent users from noticing delays when moving their heads. However, existing techniques generally cannot process high-resolution images from see-through cameras to generate virtual view frames with adequately low latencies.

Unlike optical see-through AR in which a user can see a surrounding scene directly, video see-through (VST) AR recreates the surrounding scene using see-through cameras installed on an AR headset. Because the positions of the see-through cameras are different from the positions of the user's eyes, virtual images at the viewpoints of the user's eyes are generated from the image frames captured at the viewpoints of the see-through cameras. In this manner, the user's eyes can see the outside scene through the cameras as if the see-through cameras were installed at the viewpoints of eyes.

VST AR has some advantages over other types of AR, including a wider field of view, usability in outdoor environments, dark color occlusion, and altering perception. However, VST AR systems also face certain challenges. For example, in VST AR, since the see-through camera cannot be installed at the same position of the eye, the see-through camera viewpoint is different from the eye viewpoint. Due to the differences in the viewpoints, a parallax map from the see-through camera viewpoint is different from a parallax map from the eye viewpoint. In order to obtain a correct view at the virtual camera viewpoint, the view from the see-through camera needs to be transformed to the virtual camera with parallax correction.

This disclosure provides various techniques for parallax correction for video see-through augmented reality. As described in more detail below, the disclosed systems and methods provide an efficient algorithm and pipeline for generating correct views at the virtual camera viewpoints from the see-through camera views by parallax correction. The see-through camera and virtual camera are located at different positions of the HMD. Note that while some of the embodiments discussed below are described in the context of use in consumer electronic devices (such as AR headsets), this is merely one example, and it will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for parallax correction for video see-through augmented reality.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for parallax correction for video see-through augmented reality as discussed below. These functions can be performed by a single application or by multiple applications that each carry out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for parallax correction for video see-through augmented reality.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
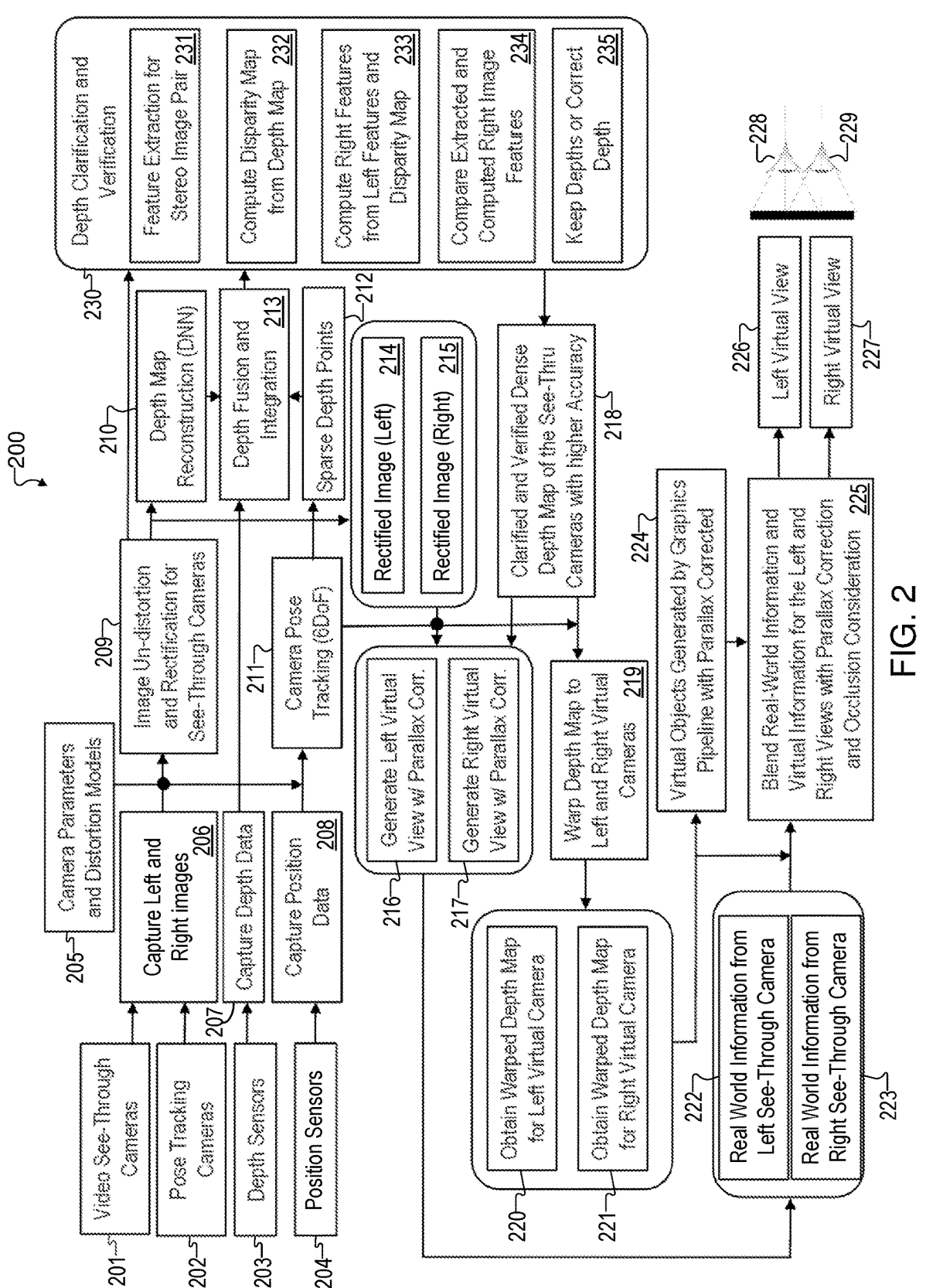
FIG. 2 illustrates an example process for parallax correction for video see-through augmented reality according to this disclosure.

FIG. 2 illustrates an example process 200 for parallax correction for video see-through augmented reality according to this disclosure. For ease of explanation, the process 200 is described as being performed using one or more components of the network configuration 100 of FIG. 1 described above, such as the electronic device 101. However, this is merely one example, and the process 200 could be performed using any other suitable device(s) and in any other suitable system(s).

As shown in FIG. 2, the electronic device 101 includes multiple sensors 180, which include one or more video see-through cameras 201, one or more pose tracking cameras 202, one or more depth sensors 203, and one or more positional sensors 204.

The video see-through cameras 201 can include first and second high-resolution see-through cameras 201. In some embodiments, the video see-through cameras 201 can be arranged as left and right high-resolution see-through cameras. The video see-through cameras 201 can capture images 206 having any suitable resolution and dimensions depending on the capabilities of the video see-through cameras 201. In some embodiments, for instance, the images 206 includes high-resolution RGB image data, which typically includes image data in three color channels (namely red, green, and blue color channels). However, the images 206 may include image data having any other suitable form or arrangement. As described in greater detail below, the images 206 can include left and right images and can be used for generating the final virtual views and rendering on the panels of the HMD.

The pose tracking cameras 202 can include any suitable cameras capable of capturing information for HMD pose tracking. For example, the pose tracking cameras 202 can capture HMD image pose tracking information that can be used with the left and right images 206 to generate a stereo image pair. In some embodiments, the pose tracking cameras 202 can include left and right pose tracking cameras. However, other numbers and arrangements of pose tracking cameras 202 are possible.

The depth sensors 203 can include any suitable type(s) of depth sensors, such as ToF sensors. The depth sensors 203 can capture depth data 207 for depth re-projection and parallax correction. The position sensors 204 can include any suitable type(s) of position sensors, such as IMU sensors. The position sensors 204 can capture head position data 208 of the user wearing the HMD. The electronic device 101 can include any suitable number and arrangement of depth sensors 203 and position sensors 204.

Figure 3A:
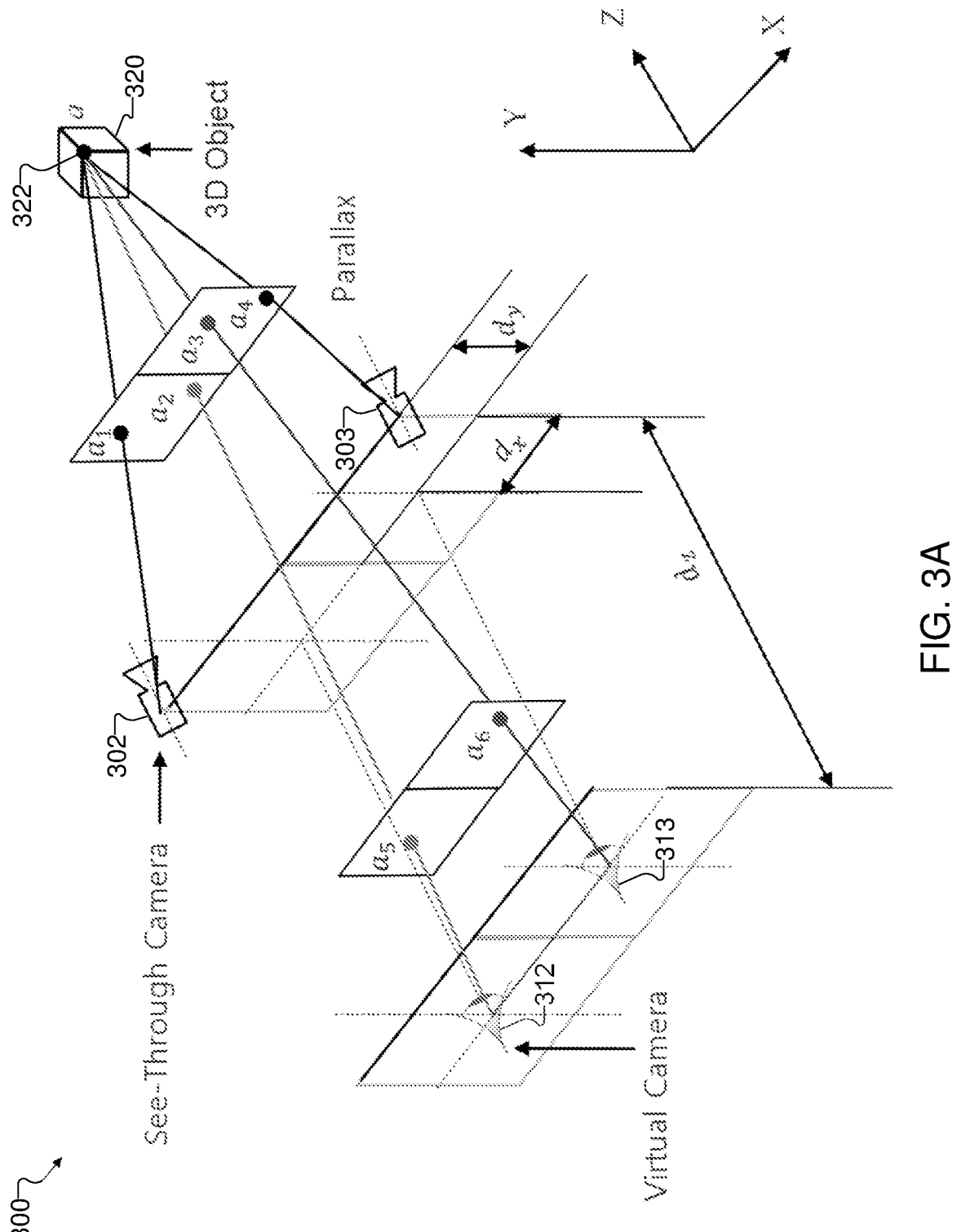
FIGS. 3A and 3B illustrate example arrangements between see-through camera viewpoints and eye (virtual camera) viewpoints according to this disclosure.
Figure 3B:
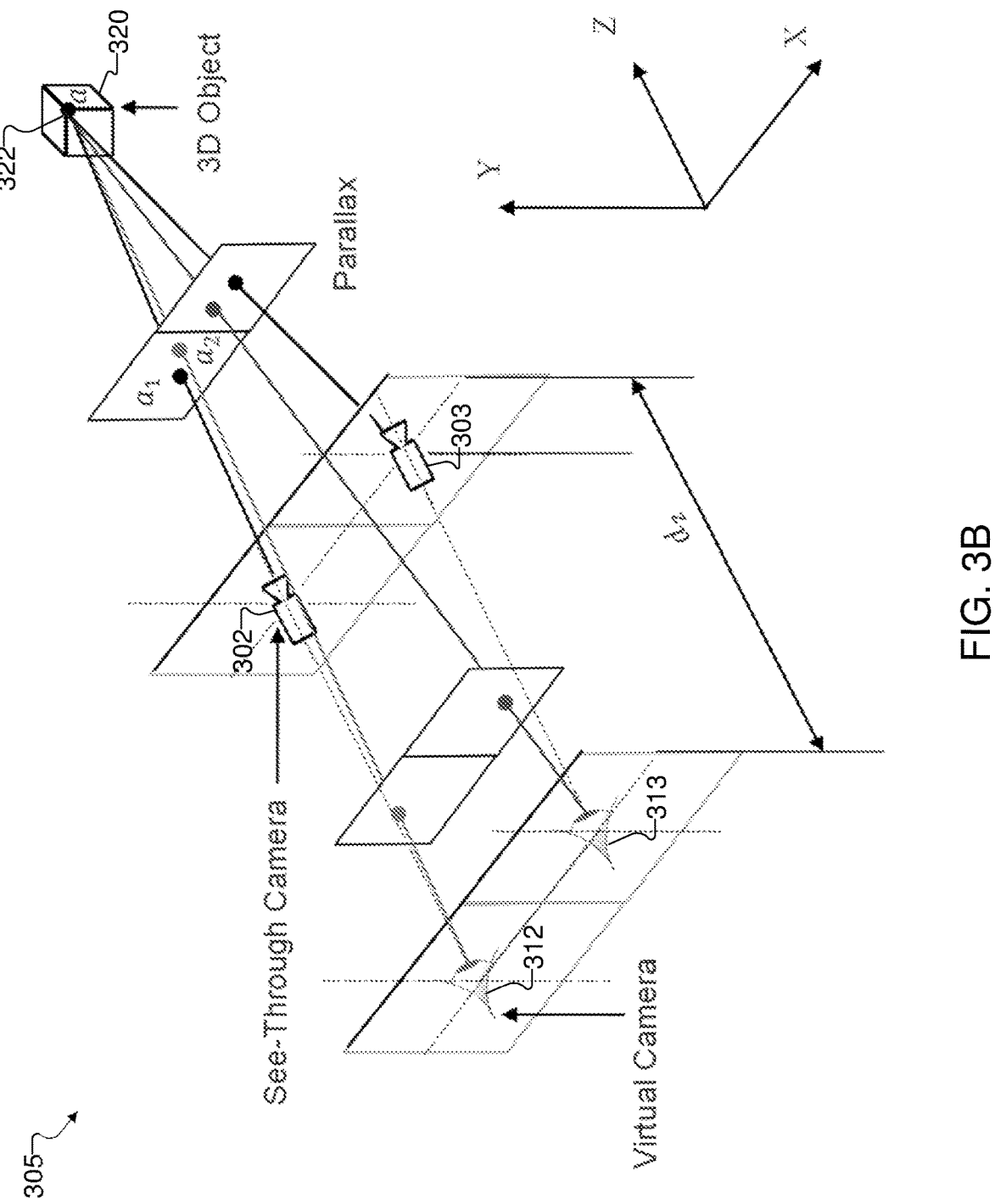

FIGS. 3A and 3B illustrates example arrangements 300 and 305 between see-through camera viewpoints and eye (virtual camera) viewpoints according to this disclosure. In particular, the arrangements 300 and 305 illustrate examples of parallax due to the relationships among a 3D scene, see-through camera imaging, and virtual camera imaging. As shown in FIGS. 3A and 3B, two see-through cameras 302 and 303 are arranged as left and right see-through cameras. The see-through cameras 302 and 303 can represent (or be represented by) the video see-through cameras 201. FIG. 3A also shows the positions of left and right virtual cameras 312 and 313, which can represent the viewpoints as seen from the left and right eyes of the user of the HMD.

In FIG. 3A, the position differences between the right see-through camera 303 and the right virtual camera 313 include dx in the X-direction, dy in the Y-direction, and dz in the Z-direction. Similar position differences exist between the left see-through camera 302 and the left virtual camera 312. When seeing a point 322 (identified as a) on a 3D object 320 of a scene, the left see-through camera 302 views a point $a_1$ while the left virtual camera 312 views point $a_2$. The difference in views is the result of parallax.

In FIG. 3B, the position of the left see-through camera 302 has changed relative to the left virtual camera 312, such that the position difference between the left see-through camera 302 and the left virtual camera 312 includes only dz in the Z-direction (i.e., dx and dy are both zero in FIG. 3B for the left see-through camera 302 and the left virtual camera 312). The viewed points $a_1$ and $a_2$ are closer together in FIG. 3B than in FIG. 3A, although some parallax still exists.

Turning again to FIG. 2, at operation 205, the electronic device 101 obtains one or more camera parameters of the video see-through cameras 201 and one or more distortion models. The camera parameters can include any suitable number of any suitable parameters, such as intrinsic parameters (e.g., focal length, lens distortion, etc.) and extrinsic parameters (e.g., transformation parameters, etc.). The distortion models can include any suitable distortion model that represents distortions of the video see-through cameras 201. At operation 209, the electronic device 101 undistorts and rectifies the images 206 with the see-through camera parameters and the distortion models to obtain a left rectified image 214 and a right rectified image 215. At operation 210, the electronic device 101 inputs the rectified images 214 and 215 to a deep neural network (DNN) to reconstruct depth maps for the images 206. The DNN represents any suitable trained or untrained neural network configured to generate a depth map from an image.

At operation 211, the electronic device 101 performs pose tracking with the HMD image pose tracking information captured by the pose tracking cameras 202 and the head position data 208 captured by the position sensors 204. By performing the pose tracking, the electronic device 101 obtains six degree-of-freedom (6DoF) camera poses. At operation 212, the electronic device 101 performs a re-localization and mapping (SLAM) process using the 6DoF camera poses to generate sparse depth points.

At operation 213, the electronic device 101 performs depth data fusion to integrate depth data from the reconstructed depth maps output by the DNN, the depth data 207 captured by the depth sensors 203, and the sparse depth points generated by the SLAM process in operation 212. The results of the operation 213 include creation of a dense depth map and a corresponding confidence map that can be provided as input to a depth clarification and verification process 230.

The electronic device 101 performs the depth clarification and verification process 230 using the dense depth map generated in operation 213 in order to obtain a high-quality verified depth map 218. The verified depth map 218 will be used later in the process 200 for parallax correction to generate correct left and right virtual views at the eye viewpoints. As described in greater detail below, the depth clarification and verification process 230 includes an efficient color image guided algorithm to correct inaccurate depths and remove noises.

As a summary description, the depth clarification and verification process 230 includes the following operations. At operation 231, the electronic device 101 extracts image features from the stereo image pair 206, and at operation 232, the electronic device 101 computes a disparity map from the dense depth map. At operation 233, using the image features of the left image 206 and the disparity map, the electronic device 101 computes corresponding image features of the right image 206. At operation 234, the electronic device 101 compares the extracted image features of the right image 206 (obtained in operation 231) and the computed image features of the right image 206 (determined in operation 233) to determine correspondence between the points in each image feature. At operation 235, the electronic device 101 stores the depths if the computed and extracted features correspond sufficiently, or the electronic device 101 corrects the depth to obtain a better accurate depth if the computed and extracted features do not correspond sufficiently. This process will now be described in greater detail in conjunction with FIG. 4.

Figure 4:
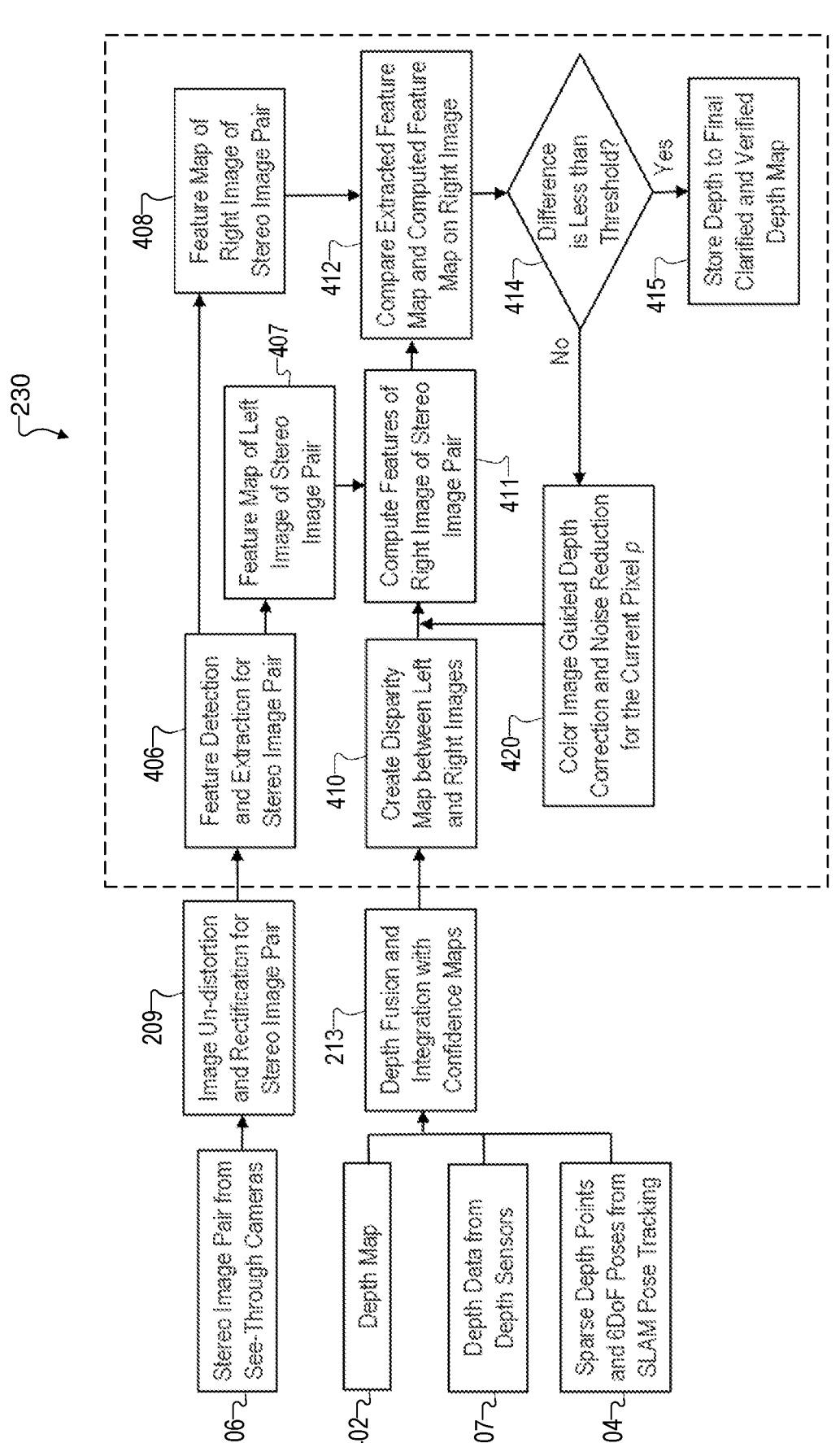
FIG. 4 illustrates further details of a depth clarification and verification process in the process of FIG. 2 according to this disclosure.

FIG. 4 illustrates further details of the depth clarification and verification process 230 according to this disclosure. Some of the operations shown and described in FIG. 4 represent corresponding operations in FIG. 2, and will be noted in such cases. As shown in FIG. 4, the inputs to the depth clarification and verification process 230 include the stereo image pairs 206 from the see-through cameras 201, the depth maps 402 reconstructed in operation 210 using the DNN, the depth data 207 captured by the depth sensors 203, and sparse depth points and 6DoF poses 404 obtained from SLAM pose tracking in operations 211 and 212.

As discussed earlier, at operation 209, the electronic device 101 undistorts and rectifies the stereo image pair 206 (using the see-through camera parameters and the distortion models from operation 205) to obtain the left rectified image 214 and the right rectified image 215. Also, at operation 213, the electronic device 101 performs the depth data fusion to integrate the depth data from the reconstructed depth maps output by the DNN, the depth data 207 captured by the depth sensors 203, and the sparse depth points 404 to obtain the dense depth map and the corresponding confidence map.

At operation 406, the electronic device 101 performs feature detection and extraction on the left rectified image 214 and the right rectified image 215 output from operation 209. At operation 407, the electronic device 101 generates a feature map of the left rectified image 214 from the extracted features. The feature map of the left rectified image 214 includes extracted positions associated with the pixels in the left rectified image 214. At operation 408, the electronic device 101 generates a feature map of the right rectified image 215 from the extracted features. The feature map of the right rectified image 215 includes extracted positions associated with the pixels in the right rectified image 215. Any suitable techniques or algorithms can be used to generate the feature maps of the left and right rectified images 214 and 215. Operations 406-408 can represent or comprise operation 231 of FIG. 2.

At operation 410, the electronic device 101 creates a disparity map between the left and right rectified images 214 and 215 using the dense depth map generated in operation 213. At operation 411, the electronic device 101 computes a feature map of the right rectified image 215 using the disparity map generated in operation 410 and the feature map of the left rectified image 214. The electronic device 101 can use any suitable techniques here for creating a disparity map and a feature map.

At operation 412, the electronic device 101 compares the extracted feature map of the right rectified image 215 (generated in operation 408) and the computed feature map of the right rectified image 215 (computed in operation 411). The electronic device 101 performs the comparison using a pixel-by-pixel comparison to a predetermined threshold. At operation 414, the electronic device 101 determines if the difference between a current pixel of the extracted feature map and the corresponding pixel of the computed feature map is less than the predetermined threshold. If the difference between the pixel of the extracted feature map and the corresponding pixel of the computed feature map is less than the predetermined threshold, then at operation 415, the electronic device 101 stores the depth of the pixel to a final depth map to be used later. Otherwise, the electronic device 101 performs a depth correction and noise reduction operation 420 for the depth of the current pixel. In the depth correction and noise reduction operation 420, the electronic device 101 performs color image guided depth correction. Here, multiple types of information are used for depth correction, including depth information, color texture information, and spatial information.

Figure 5:
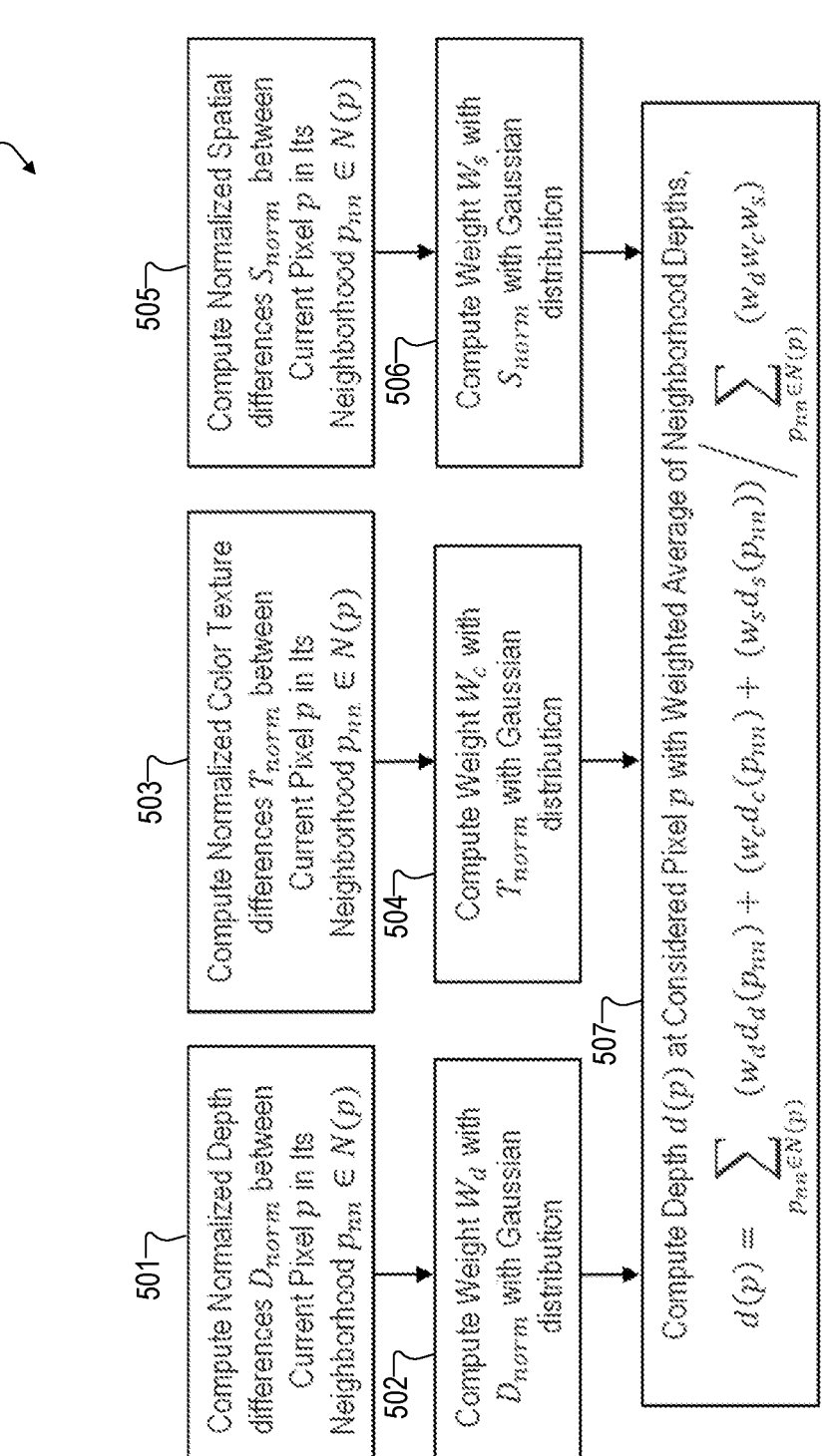
FIG. 5 illustrates details of a depth correction and noise reduction operation in the process of FIG. 4 according to this disclosure.

FIG. 5 illustrates details of the depth correction and noise reduction operation 420 using depth information, color texture information, and spatial information, according to this disclosure. As shown in FIG. 5, at operation 501, the electronic device 101 computes normalized depth differences $D_{norm}$ between the current pixel p and the neighboring pixels $p_{nn} \in N(p)$ of the extracted feature map, such as by the following equation:

$$D_{norm} = \|d(p) - d(p_{nn})\|, \tag{1}$$

where d(p) is the depth at pixel p, and $d(p_{nn})$ is the depth at the neighboring pixels $p_{nn}$, where $p_{nn} \in N(p)$.

At operation 502, the electronic device 101 computes a weight W d from the normalized depth differences $D_{norm}$, such as by the following equation:

$$W_d = \frac{1}{\sigma_d \sqrt{2\pi}} e^{-\frac{1}{2}\left(\frac{D_{norm}-\mu_d}{\sigma_d}\right)^2}, \tag{2}$$

where $D_{norm}$ is the normalized depth difference, and $(\sigma_d, \mu_d)$ are the standard deviation and mean in a Gaussian distribution.

At operation 503, the electronic device 101 computes normalized color texture differences $T_{norm}$ between the current pixel p and the neighboring pixels $p_{nn} \in N(p)$, such as by the following equation:

$$T_{norm} = \|c(p) - c(p_{nn})\|, \tag{3}$$

where c(p) is the color at pixel p, and $c(p_{nn})$ is the color at the neighboring pixels $p_{nn}$.

At operation 504, the electronic device 101 computes a weight $W_c$ from the normalized color texture differences $T_{norm}$, $$W_c = \frac{1}{\sigma_c \sqrt{2\pi}} e^{-\frac{1}{2}\left(\frac{T_{norm}-\mu_c}{\sigma_c}\right)^2}, \tag{4}$$

where $T_{norm}$ is the normalized depth difference, and $(\sigma_c, \mu_c)$ are the standard deviation and mean in a Gaussian distribution.

At operation 505, the electronic device 101 computes normalized spatial differences $S_{norm}$ between the current pixel p and the neighboring pixels $p_{nn} \in N(p)$, such as by the following equation:

$$S_{norm} = \|s(P) - s(p_{nn})\| \tag{5}$$

where s(p) is the position at pixel p, and $s(p_{nn})$ is the position at the neighboring pixels $p_{nn}$.

At operation 506, the electronic device 101 computes the weight $W_s$ from the normalized spatial differences $S_{norm}$, such as by the following equation:

$$W_s = \frac{1}{\sigma_s \sqrt{2\pi}} e^{-\frac{1}{2}\left(\frac{S_{norm}-\mu_s}{\sigma_s}\right)^2} \tag{6}$$

where $S_{norm}$ is the normalized spatial difference, and $(\sigma_s, \mu_s)$ are the standard deviation and mean in a Gaussian distribution.

At operation 507, the electronic device 101 computes the depth d(p) at the considered pixel p with the weighted average of the neighborhood depths, such as by the following equation:

$$d(P) = \sum_{P_{nn} \in N(p)} (w_d d_d(p_{nn}) + (w_c d_c(p_{nn}) + (w_s d_s(p_{nn}))/ \sum_{P_{nn} \in N(p)} (w_d w_c w_s) \tag{7}$$

Figure 6:
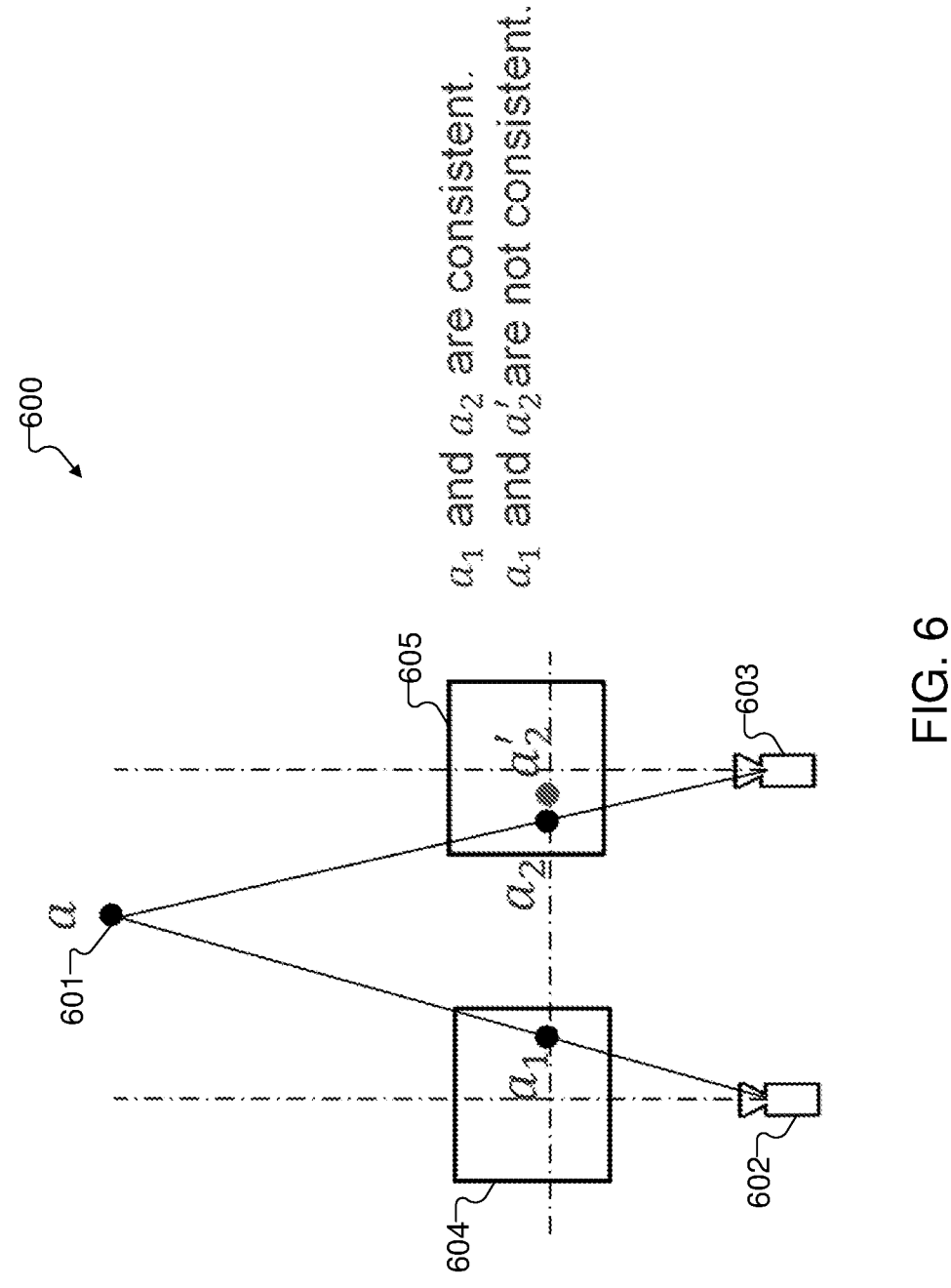
FIG. 6 illustrates an example of consistency between images according to this disclosure.

Turning again to FIG. 4, after the electronic device 101 performs the depth correction and noise reduction operation 420 to obtain the depth d(p), the electronic device 101 repeats operations 411, 412, and 414 until the electronic device 101 obtains a better depth. The electronic device 101 performs these operations for all pixels in the extracted feature map and the corresponding computed feature map to obtain the verified depth map 218. The verified depth map 218 helps to ensure consistency between the left and right images 206 captured by the see-through cameras 201. FIG. 6 illustrates an example 600 of consistency between images according to this disclosure. As shown in FIG. 6, a point 601 on an object (identified as a) appears in the views 604 and 605 of two see-through cameras 602 and 603 (which can represent the see-through cameras 201). The points $a_1$ and $a_2$ in the views 604 and 605 are consistent because they both appear on the direct lines between the see-through cameras 602 and 603 and the point 601. However, the points $a_1$ and $a'_2$ are not consistent because the point $a'_2$ is not on the same line as the point $a_2$.

Figure 7:
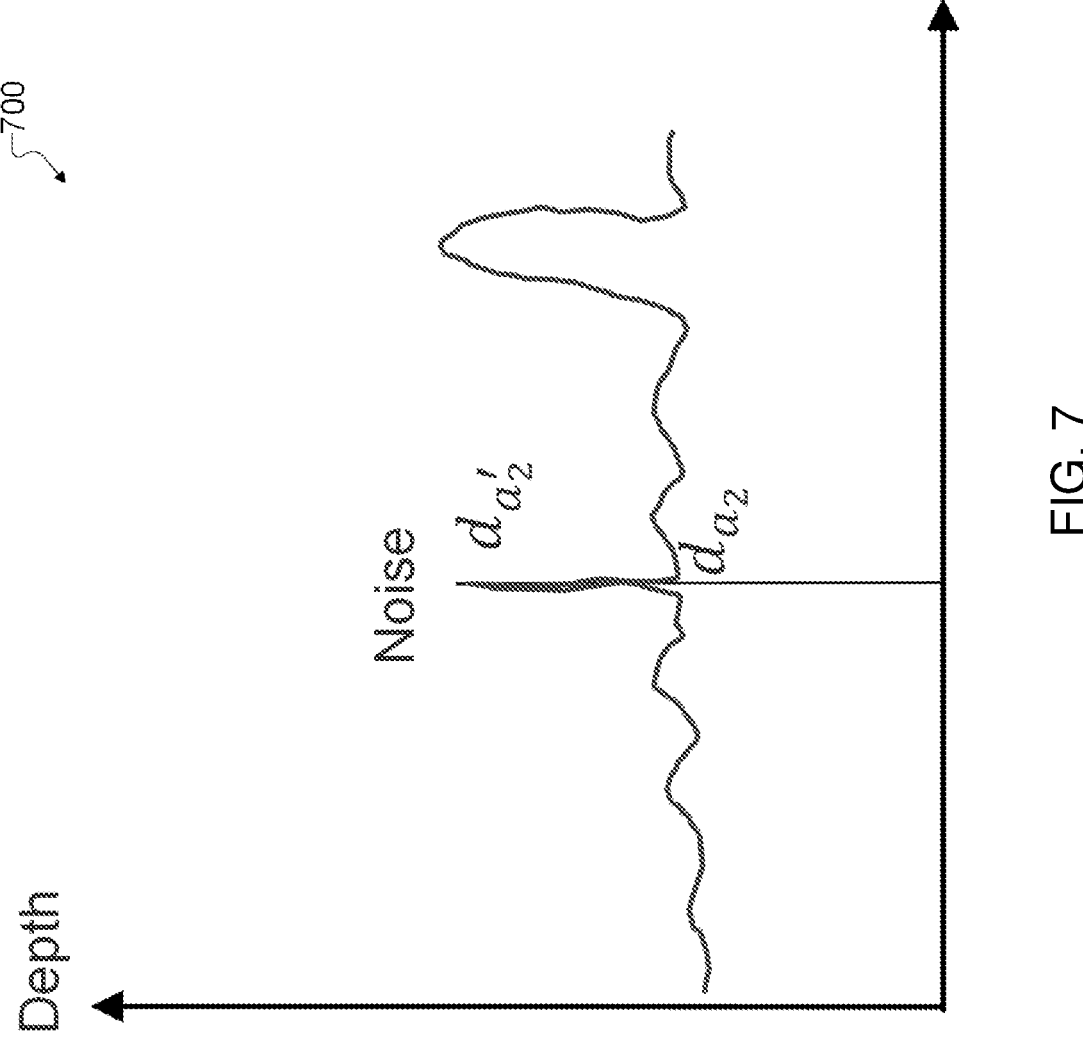
FIG. 7 illustrates an example chart showing correct and incorrect depth information according to this disclosure.

FIG. 7 illustrates an example chart 700 showing correct and incorrect depth information according to this disclosure. As shown in FIG. 7, the chart 700 shows depth information for multiple pixels. The pixel $a_2$ is at a correct depth $d_{a_2}$, while the pixel $a'_2$ is at an incorrect depth or noise $d_{a'_2}$. The depth correction and noise reduction operation 420 generates a correct depth with image guided depth reconstruction, and replaces the incorrect depth $d_{a'_2}$ with the reconstructed correct depth.

Turning again to FIG. 2, after the electronic device 101 generates the verified depth map 218 in the depth clarification and verification process 230, the electronic device 101 generates a left virtual view 216 and a right virtual view 217 using the verified depth map 218, the left and right rectified images 214 and 215, and the 6DoF poses. The left virtual view 216 and the right virtual view 217 feature parallax correction from the see-through camera viewpoints to the virtual camera viewpoints.

Figure 8:
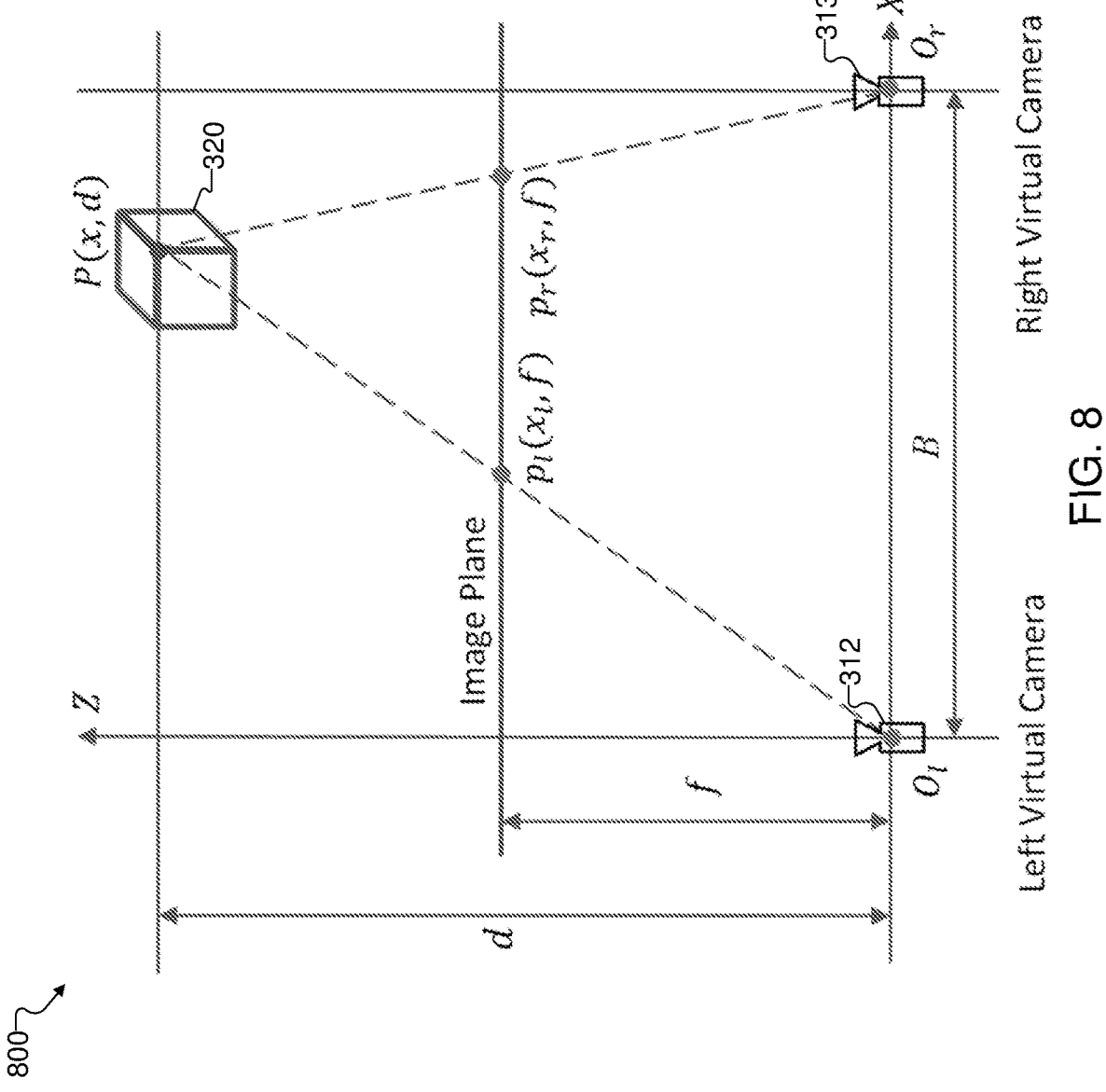
FIG. 8 illustrates an example diagram showing further details of a left virtual view and a right virtual view according to this disclosure.

FIG. 8 illustrates an example diagram 800 showing further details of the left virtual view 216 and the right virtual view 217 according to this disclosure. As shown in FIG. 8, when the left virtual camera 312 and the right virtual camera 313 view the same point P(x, d) on the object 320, the left virtual camera 312 sees point $p_l(x_l, f)$ and the right virtual camera 313 sees point $p_r(x_r, f)$ in the image plane.

The relationship between the left virtual view 216 and the right virtual view 217 is given as follows:

$$x_l - x_r = \frac{Bf}{d} \tag{8}$$

where $(x_l, f)$ is a pixel position on the left virtual view 216, $(x_r, f)$ is a pixel position on the right virtual view 217, B is the distance between the left and right virtual cameras 312 and 313, f is the focal length of the virtual cameras 312 and 313, and d is the depth of the point P(x, d) which is obtained from the verified depth map 218.

Thus, the electronic device 101 can compute the right virtual view 217 ($x_r$) from the left virtual view 216 ($x_l$) and the verified depth map 218, using the following equation:

$$x_r = x_l - \frac{Bf}{d}. \tag{9}$$

In addition, the electronic device 101 performs a warping operation 219 to warp the verified depth map 218 into a left warped depth map 220 and a right warped depth map 221 corresponding to the left and right virtual cameras 312 and 313. At operation 224, the electronic device 101 creates virtual objects using a graphics pipeline and the left and right warped depth maps 220 and 221. In this way, the created virtual objects are already parallax corrected for the left virtual view 216 and the right virtual view 217.

At operation 225, the electronic device 101 blends real-world information 222 and 223 captured from the see-through cameras 201 with the virtual information (objects) generated by the graphics pipeline in operation 224 and the warped depth maps 220 and 221 to create the final (parallax-corrected) left virtual view 226 and the final (parallax-corrected) right virtual view 227, such that the electronic device 101 can display the integrated information in correct views at eye viewpoints 228 and 229 in the VST AR headset.

Figure 9:
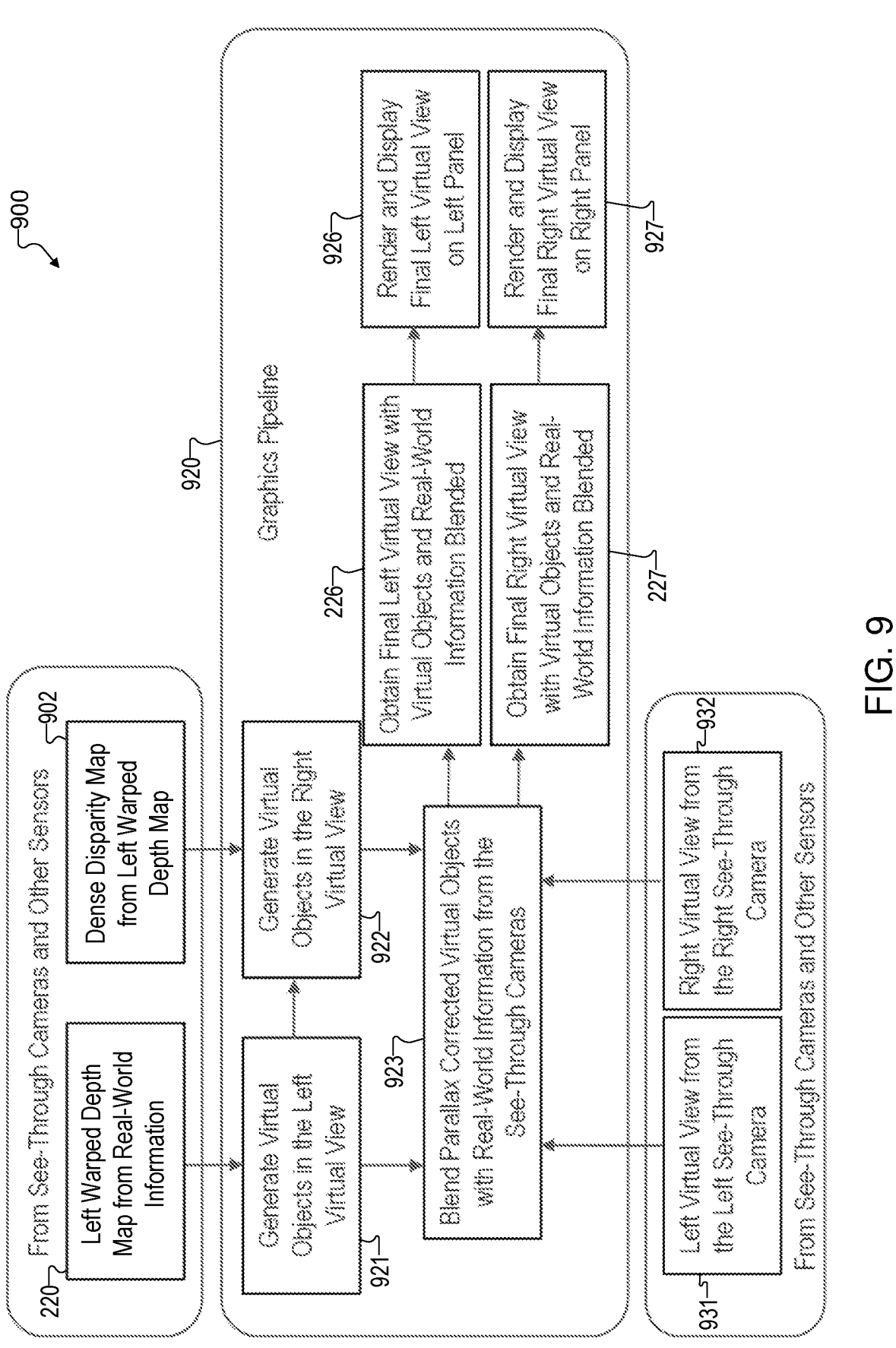
FIG. 9 shows details of a process for generating parallax-corrected virtual objects by a graphics pipeline for display on a VST AR headset according to this disclosure.

FIG. 9 shows further details of a process 900 for generating the parallax-corrected virtual objects by the graphics pipeline for display on the VST AR headset according to this disclosure. As shown in FIG. 9, many of the operations shown and described in the process 900 represent corresponding operations in FIG. 2, and will be noted in such cases.

The electronic device 101 obtains real-world depth information including the left warped depth map 220 and a dense disparity map 902 generated from the left warped depth map 220. The electronic device 101 then generates virtual objects using the graphics pipeline 920, which can be, e.g., OpenGL, Unity, and the like. This can be the same as or similar to the operation 224 of FIG. 2. In particular, the electronic device 101 generates left virtual objects 921 in the left virtual view using the left warped depth map 220, such that the left virtual objects 921 have the same parallax as the left virtual view 931 generated from the see-through cameras 201. The electronic device 101 generates right virtual objects 922 in the right virtual view with the generated left virtual objects 921 and the dense disparity map 902. In this way, the generated right virtual objects 922 have the same parallax as the right virtual view 932 generated from the see-through camera 201. The left virtual view 931 and the right virtual view 932 are from the see-through cameras 201 or other sensors, and the parallax is corrected with the eye viewpoints 228 and 229.

At operation 923, the electronic device 101 blends the parallax-corrected left and right virtual objects 921 and 922 with the left and right virtual view 931 and 932 by considering occlusion relationships with the left warped depth map 220. This can be the same as or similar to the operation 225 of FIG. 2. The electronic device 101 then obtains the final left virtual view 226 with the virtual objects and the real-world information both blended and parallax-corrected, and obtains the final right virtual view 227 with the virtual objects and the real-world information both blended and parallax-corrected.

Finally, the electronic device 101 renders and displays the final left virtual view 226 on the left panel 926, and renders and displays the final right virtual view 227 on the right panel 927 of the VST AR headset. The user can see the information at the eye viewpoints 228 and 229.

Although FIG. 2 through 9 illustrate examples of a process 200 for parallax correction for video see-through augmented reality and related details, various changes may be made to FIGS. 2 through 9. For example, while described as involving specific sequences of operations, various operations of the techniques described with respect to FIGS. 2 through 9 could overlap, occur in parallel, occur in a different order, or occur any number of times (including zero times). Also, the specific operations shown in FIGS. 2 through 9 are examples only, and other techniques could be used to perform each of the operations shown in FIGS. 2 through 9.

As an example of another technique, the electronic device 101 clarifies and verifies the depths integrated from various sources with the relationship of the stereo camera pair. The electronic device 101 can extend this technique with other techniques of depth clarification and verification. For example, the electronic device 101 can create an energy function having a combination of a data term and a smooth term. The data term describes the differences of the depths between the considered point and the points that have high confidences. The smooth term describes the differences of depths between the considered point and the neighboring points. By minimizing the energy function, the electronic device 101 can keep the depths at the points with high confidences unchanged and make the other points closer to the neighboring values without sudden changes. With this technique, the electronic device 101 can refine the depth map generated by previous steps. With the refined depth map, the electronic device 101 can create the left and right virtual views with corrected parallax.

As another example, the techniques described above feature systems with two see-through cameras. These techniques can be extended to systems that have more than two see-through cameras. For example, the electronic device 101 can reconstruct a depth map from these multiple cameras and create the left and right virtual views at the virtual camera viewpoints by re-projecting the multiple see-through cameras to the virtual cameras. The electronic device 101 creates virtual objects with parallax corrected by as described above, with the depth maps obtained from the multiple see-through cameras. The electronic device 101 then integrates with the real-world information captured from the see-through cameras to create the final virtual views.

Note that the operations and functions shown in or described with respect to FIGS. 2 through 9 can be implemented in an electronic device 101, 102, 104, server 106, or other device(s) in any suitable manner. For example, in some embodiments, the operations and functions shown in or described with respect to FIGS. 2 through 9 can be implemented or supported using one or more software applications or other software instructions that are executed by the processor 120 of the electronic device 101, 102, 104, server 106, or other device(s). In other embodiments, at least some of the operations and functions shown in or described with respect to FIGS. 2 through 9 can be implemented or supported using dedicated hardware components. In general, the operations and functions shown in or described with respect to FIGS. 2 through 9 can be performed using any suitable hardware or any suitable combination of hardware and software/firmware instructions.

Figure 10:
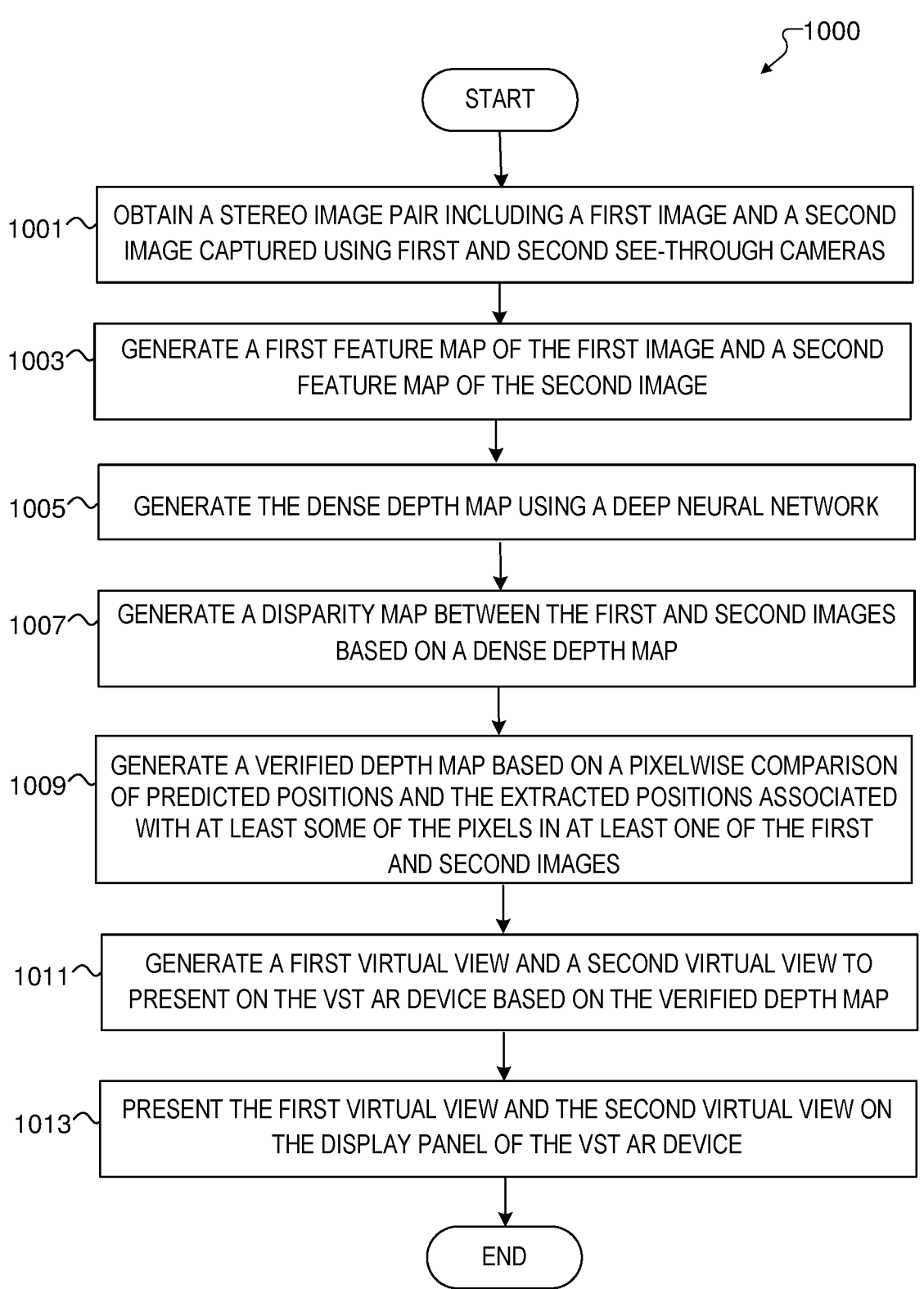
FIG. 10 illustrates an example method for parallax correction for video see-through augmented reality according to this disclosure.

FIG. 10 illustrates an example method 1000 for parallax correction for video see-through augmented reality according to this disclosure. For ease of explanation, the method 1000 shown in FIG. 10 is described as involving the use of the process 200 shown in FIG. 2 and the electronic device 101 shown in FIG. 1. However, the method 1000 shown in FIG. 10 could be used with any other suitable process(es) and device(s).

As shown in FIG. 10, at step 1001, a stereo image pair is obtained that includes a first image and a second image captured using first and second see-through cameras associated with a VST AR device. This could include, for example, the electronic device 101 obtaining left and right images 206 using left and right see-through cameras 201.

At step 1003, a first feature map of the first image and a second feature map of the second image are generated. The first feature map includes extracted positions associated with pixels in the first image, and the second feature map includes extracted positions associated with pixels in the second image. This could include, for example, the electronic device 101 performing operations 407 and 408 to generate the left and right feature maps from the left and right rectified images 214 and 215.

At step 1005, a dense depth map is generated using a DNN. This could include, for example, the electronic device 101 performing operations 210 through 213 to generate the dense depth map using the DNN. At step 1007, a disparity map is generated between the first and second images based on the dense depth map. This could include, for example, the electronic device 101 performing operation 410 to create the disparity map between the left and right rectified images 214 and 215 using the dense depth map.

At step 1009, a verified depth map is generated based on a pixelwise comparison of predicted positions and the extracted positions associated with at least some of the pixels in at least one of the first and second images. The predicted positions are determined based on the disparity map. This could include, for example, the electronic device 101 performing the depth clarification and verification process 230 to generate the verified depth map 218.

At step 1011, a first virtual view and a second virtual view are generated to present on a display panel of the VST AR device based on the verified depth map. This could include, for example, the electronic device 101 generating the final left virtual view 226 and the final right virtual view 227 for display on the left panel 926 and the right panel 927 of the VST AR headset. At step 1013, the first virtual view and the second virtual view are presented on the display panel of the VST AR device. This could include, for example, the electronic device 101 displaying the final left virtual view 226 and the final right virtual view 227 on the left panel 926 and the right panel 927 respectively.

Although FIG. 10 illustrates one example of a method 1000 for parallax correction for video see-through augmented reality, various changes may be made to FIG. 10. For example, while shown as a series of steps, various steps in FIG. 10 could overlap, occur in parallel, occur in a different order, or occur any number of times.

As discussed above, the disclosed embodiments provide techniques for depth correction and noise reduction. The disclosed embodiments can generate better depth maps for depth-based image re-projection. Compared to conventional techniques (which can generate visible noise on the created virtual views), the disclosed high quality depth maps can generate high quality virtual camera views on headset devices. The disclosed embodiments also provide improved techniques for parallax correction for different real-world camera viewpoints and generated virtual objects. The disclosed techniques can set the virtual objects to the virtual views with the same parallax as the real-world information from the see-through cameras using the read-world depth information. The disclosed techniques can also use one or more of depth clarification, depth verification, depth correction, and noise reduction to handle false depth cases such as an object in the scene having different colors in different areas.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining a stereo image pair including a first image and a second image captured using first and second see-through cameras associated with a video see-through (VST) augmented reality (AR) device;

generating a first feature map of the first image and a second feature map of the second image, the first feature map including extracted positions associated with pixels in the first image, the second feature map including extracted positions associated with pixels in the second image;

generating a disparity map between the first and second images based on a dense depth map;

generating a verified depth map based on a pixelwise comparison of predicted positions and the extracted positions associated with at least some of the pixels in at least one of the first and second images, the predicted positions determined based on the disparity map, and wherein, for each pixel in the first image that represents a point in space, either a depth value or a corrected depth value is stored in the verified depth map based on a threshold; and generating a first virtual view and a second virtual view to present on a display panel of the VST AR device based on the verified depth map, wherein generating the first virtual view and the second virtual view based on the verified depth map comprises warping the verified depth map to generate a first warped depth map for a first virtual camera and a second warped depth map for a second virtual camera.

2. The method of claim 1, wherein generating the verified depth map comprises:

for each pixel in the first image that represents a point in space:

determining a predicted position of a pixel in the second image representing the point based on the extracted position of that pixel in the first feature map and a disparity value associated with that pixel from the disparity map;

comparing the predicted position of the pixel in the second image to the extracted position of the pixel in the second feature map; and one of:

in response to a difference between the predicted position and the extracted position being less than the threshold, storing, in the verified depth map, the depth value associated with that pixel in the dense depth map; and in response to the difference between the predicted position and the extracted position being greater than the threshold, determining the corrected depth value and storing the corrected depth value in the verified depth map.

3. The method of claim 2, wherein the predicted position of the pixel in the second image is determined using an equation:

$$x_r = x_l - \frac{Bf}{d}$$

where $x_r$ represents the predicted position of the pixel in the second image, $x_l$ represents the extracted position of the pixel in the first feature map, B represents a distance between first and second virtual camera positions associated with the VST AR device, f represents a focal length, and d represents a depth value associated with the pixel.

4. The method of claim 2, wherein the corrected depth value is determined based on the dense depth map and color and spatial information from at least one of the first and second images.

5. The method of claim 1, wherein generating the first virtual view and the second virtual view based on the verified depth map further comprises:

generating first and second virtual objects using the first and second warped depth maps;

generating the first virtual view using the first warped depth map and real world information; and generating the second virtual view using the second warped depth map and the real world information.

6. The method of claim 1, further comprising:

generating the dense depth map using a deep neural network (DNN).

7. The method of claim 1, further comprising:

presenting the first virtual view and the second virtual view on the display panel of the VST AR device.

8. A video see-through (VST) augmented reality (AR) device comprising:

at least one display panel;

first and second see-through cameras; and at least one processing device configured to:

obtain a stereo image pair including a first image and a second image captured using the first and second see-through cameras;

generate a first feature map of the first image and a second feature map of the second image, the first feature map including extracted positions associated with pixels in the first image, the second feature map including extracted positions associated with pixels in the second image;

generate a disparity map between the first and second images based on a dense depth map;

generate a verified depth map based on a pixelwise comparison of predicted positions and the extracted positions associated with at least some of the pixels in at least one of the first and second images, the predicted positions determined based on the disparity map, and wherein, for each pixel in the first image that represents a point in space, either a depth value or a corrected depth value is stored in the verified depth map based on a threshold; and generate a first virtual view and a second virtual view to present on a display panel of the VST AR device based on the verified depth map, wherein to generate the first virtual view and the second virtual view based on the verified depth map, the at least one processing device is configured to warp the verified depth map to generate a first warped depth map for a first virtual camera and a second warped depth map for a second virtual camera.

9. The VST AR device of claim 8, wherein to generate the verified depth map, the at least one processing device is configured to:

for each pixel in the first image that represents a point in space:

determine a predicted position of a pixel in the second image representing the point based on the extracted position of that pixel in the first feature map and a disparity value associated with that pixel from the disparity map;

compare the predicted position of the pixel in the second image to the extracted position of the pixel in the second feature map; and one of:

in response to a difference between the predicted position and the extracted position being less than the threshold, store, in the verified depth map, the depth value associated with that pixel in the dense depth map; and in response to the difference between the predicted position and the extracted position being greater than the threshold, determine the corrected depth value and store the corrected depth value in the verified depth map.

10. The VST AR device of claim 9, wherein the at least one processing device is configured to determine the predicted position of the pixel in the second image using an equation:

$$x_r = x_l - \frac{Bf}{d}$$

where $x_r$ represents the predicted position of the pixel in the second image, $x_l$ represents the extracted position of the pixel in the first image feature map, B represents a distance between first and second virtual camera positions associated with the VST AR device, f represents a focal length, and d represents a depth value associated with the pixel.

11. The VST AR device of claim 9, wherein the at least one processing device is configured to determine the corrected depth value based on the dense depth map and color and spatial information from at least one of the first and second images.

12. The VST AR device of claim 8, wherein to generate the first virtual view and the second virtual view based on the verified depth map, the at least one processing device is further configured to:

generate first and second virtual objects using the first and second warped depth maps;

generate the first virtual view using the first warped depth map and real world information; and generate the second virtual view using the second warped depth map and the real world information.

13. The VST AR device of claim 8, wherein the at least one processing device is further configured to:

generate the dense depth map using a deep neural network (DNN).

14. The VST AR device of claim 8, wherein the at least one processing device is further configured to:

control the display panel to present the first virtual view and the second virtual view.

15. A non-transitory machine readable medium containing instructions that when executed cause at least one processor to:

obtain a stereo image pair including a first image and a second image captured using first and second see-through cameras associated with a video see-through (VST) augmented reality (AR) device;

generate a first feature map of the first image and a second feature map of the second image, the first feature map including extracted positions associated with pixels in the first image, the second feature map including extracted positions associated with pixels in the second image;

generate a disparity map between the first and second images based on a dense depth map;

generate a verified depth map based on a pixelwise comparison of predicted positions and the extracted positions associated with at least some of the pixels in at least one of the first and second images, the predicted positions determined based on the disparity map, and wherein, for each pixel in the first image that represents a point in space, either a depth value or a corrected depth value is stored in the verified depth map based on a threshold; and generate a first virtual view and a second virtual view to present on a display panel of the VST AR device based on the verified depth map, wherein the instructions that cause the at least one processor to generate the first virtual view and the second virtual view based on the verified depth map comprise instructions to warp the verified depth map to generate a first warped depth map for a first virtual camera and a second warped depth map for a second virtual camera.

16. The non-transitory machine readable medium of claim 15, wherein the instructions that cause the at least one processor to generate the verified depth map comprise instructions to:

for each pixel in the first image that represents a point in space:

determine a predicted position of a pixel in the second image representing the point based on the extracted position of that pixel in the first feature map and a disparity value associated with that pixel from the disparity map;

compare the predicted position of the pixel in the second image to the extracted position of the pixel in the second feature map; and one of:

in response to a difference between the predicted position and the extracted position being less than the threshold, store, in the verified depth map, the depth value associated with that pixel in the dense depth map; and in response to the difference between the predicted position and the extracted position being greater than the threshold, determine the corrected depth value and store the corrected depth value in the verified depth map.

17. The non-transitory machine readable medium of claim 16, wherein the predicted position of the pixel in the second image is determined using an equation:

$$x_r = x_l - \frac{Bf}{d}$$

where $x_r$ represents the predicted position of the pixel in the second image, $x_l$ represents the extracted position of the pixel in the first feature map, B represents a distance between first and second virtual camera positions associated with the VST AR device, f represents a focal length, and d represents a depth value associated with the pixel.

18. The non-transitory machine readable medium of claim 16, wherein the corrected depth value is determined based on the dense depth map and color and spatial information from at least one of the first and second images.

19. The non-transitory machine readable medium of claim 15, wherein the instructions that cause the at least one processor to generate the first virtual view and the second virtual view based on the verified depth map further comprise instructions to:

generate first and second virtual objects using the first and second warped depth maps;

generate the first virtual view using the first warped depth map and real world information; and generate the second virtual view using the second warped depth map and the real world information.

20. The non-transitory machine readable medium of claim 15, further containing instructions that when executed cause the at least one processor to:

generate the dense depth map using a deep neural network (DNN).

* * * * *